US004001679B2

United States Statutory Invention Registration [19]

[11] Reg. Number: H1679

Banerjee et al.

[45] Published: Sep. 2, 1997

[54] PROCESS FOR PREPARING AN OPTICALLY PURE INTERMEDIATE FOR A PHOSPHONOSULFONATE SOUALENE SYNTHETASE INHIBITOR

[75] Inventors: Amit Banerjee, Yardley, Pa.; Ramesh N. Patel, Bridgewater; Laszlo J. Szarka, East Brunswick, both of N.J.

[73] Assignee: Bristol-Myers Squibb Company, Princeton, N.J.

[21] Appl. No.: 748,324

[22] Filed: Nov. 13, 1996

[51] Int. Cl.[6] ..... C07F 9/28

[52] U.S. Cl. ..... 435/280

*Primary Examiner*—Charles T. Jordan
*Assistant Examiner*—Meena Chelliah
*Attorney, Agent, or Firm*—Burton Rodney

[57] ABSTRACT

A process is provided for preparing a substantially optically pure phosphonate ester or phosphonate thioester intermediate via an enzymatically catalyzed enantioselective reaction, which intermediate is employed in preparing phosphonosulfonate squalene synthetase inhibitors.

17 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS FOR PREPARING AN OPTICALLY PURE INTERMEDIATE FOR A PHOSPHONOSULFONATE SOUALENE SYNTHETASE INHIBITOR

FIELD OF THE INVENTION

The present invention relates to a process for preparing a substantially optically pure phosphonate ester or phosphonate thioester intermediate(s) via an enzymatically catalyzed enantioselective reaction, and to a process for preparing a substantially optically pure phosphono-sulfonate squalene synthetase inhibitor employing such intermediate(s).

BACKGROUND OF THE INVENTION

U.S. application Ser. No. 266,843, filed Jul. 5, 1994 (file HX59c) discloses α-phosphono-sulfonate compounds which are squalene synthetase inhibitors and thereby inhibit cholesterol biosynthesis, and thus are useful as hypocholesterolemic and antiatherosclerotic agents. These compounds include those of the following structure

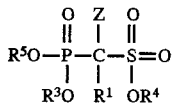

wherein $R^3$ and $R^5$ are the same or different and are H, alkyl, arylalkyl, aryl, cycloalkyl, a metal ion or other pharmaceutically acceptable cations as defined below, or a prodrug ester;

$R^4$ is H, alkyl, cycloalkyl, aryl, aryl-alkyl, metal ion or other pharmaceutically acceptable cations as defined below, or a prodrug ester;

Z is H, halogen, lower alkyl or lower alkenyl;

$R^1$ a lipophilic group containing at least 7 carbons, including pharmaceutically acceptable salts thereof.

DESCRIPTION OF THE INVENTION

In accordance with the present invention, a process is provided for preparing a substantially optically pure phosphonate of the structure

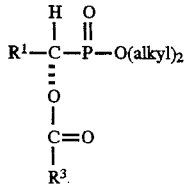

I wherein $R^1$ is a lipophilic group containing at least 7 carbons as defined hereinafter; and $R^3$ is alkyl, cycloalkyl, aryl or arylalkyl; which includes the steps of reacting a racemic phosphonate alcohol of the structure II

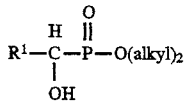

II wherein $R^1$ is as defined above, with an ester of the structure III

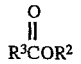

III wherein $OR^2$ represents a leaving group and R2 is alkyl, aryl, arylalkyl or alkenyl, in the presence of an enzyme or microorganism which is a source for enzyme capable of catalyzing transesterification of an alcohol, to form the substantially optically pure phosphonate I, and recovering the substantially optically pure phosphonate I for use in preparing a phosphonosulfonate squalene synthetase inhibitor as described in U.S. application Ser. No. 266,843 filed Jul. 5, 1994 (file HX59c) (which is incorporated herein by reference).

In addition, in accordance with the present invention, a process is provided for preparing a substantially optically pure phosphonate thioester of the structure IV

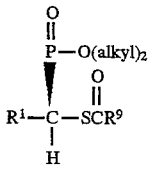

IV wherein $R^9$ is alkyl, which includes the steps of treating a racemic phosphonate thioester V

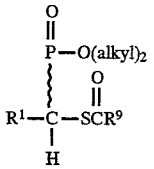

V with an enzyme or microorganism which is a source of enzyme capable of stereoselectively hydrolyzing the thioester bond to form the substantially optically pure phosphonate thioester IV, for use in preparing a phosphonosulfonate squalene synthetase inhibitor as described in U.S. application Ser. No. 266,843 filed Jul. 5, 1994 (file HX59c).

In accordance with the present invention, it has been found that the ester of formula III, in the presence of lipases or esterases (or microorganisms capable of producing same), is capable of catalyzing the stereoselective transesterification of alcohols such as compound II. This process produces alcohols in the undesired enantiomeric form IA

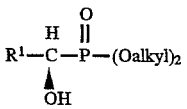

IA and the resulting "by-product" is in fact a high yield of substantially optically pure unreacted desired enantiomers of formula I.

In addition, lipases or esterases employed herein are capable of stereoselectively hydrolyzing racemic thioester V to the desired thioester enantiomer IV.

In forming the substantially optically pure phosphonate I and phosphonate thioester IV, the reaction of the racemic phosphonate alcohol II or the racemic phosphonate thioester V and the enzyme or microorganism is carried out at a temperature within the range of from about 15 to about 60° C., preferably from about 20° to about 50° C., for a period of from about 45 to about 250 hours, preferably from about 48 to about 72 hours. The reaction will be carried out in the presence of an inert organic solvent such as toluene, t-butyl-methyl ether, 1,1,2-trichloro-1,2,2-trifluoroethane, cyclohexane, benzene, hexane, heptane, tetrahydrofuran, dimethylformamide, isooctane and octane, preferably toluene.

Intermediates produced by the processes of this invention may be used in procedures described in the above cited patent application to prepare useful squalene synthetase inhibitors. S enantiomers prepared byprocesses of this invention may also be inverted to the associated R enantiomers. See, for example, Mitsunobu reaction procedures described in Babiak et al., *J. Org. Chem.* 55, 3377-3378 (1990).

The processes of the present invention have the advantage of producing an enantiomeric specific result. When the transformation is catalyzed at ambient temperature and pressure, one obtains high conversion and enantiomeric purity of the desired enantiomer.

Acylating agents useful in the present invention are organic acids, halides, esters, and acid anhydrides. Exemplary acylating agents are acetic acid, isopropenyl acetate, vinyl butyrate, vinyl acetate, various other acetates, and the like. Additional acylating agents are generally known in the art; see, for example, *Methoden der Organischen Chemie* (Houben-Weil), Vol. XV, part II, p. 1 et seq. (1974). Isopropenyl acetate, vinyl acetate, and vinyl butyrate are preferred.

Further, in accordance with the present invention, there is provided a process for preparing α-phosphonosulfonate compounds, employing as starting materials or intermediates the substantially optically pure phosphonate I or IV. The α-phosphonosulfonate product inhibits cholesterol biosynthesis (as described in U.S. application Ser. No. 266,843 filed Jul. 5, 1994), and thus is useful as an hypocholesterolemic and antiatherosclerotic agent, and has the following structure

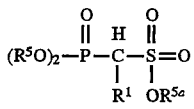

VI wherein $R^5$ is H, alkyl, arylalkyl, aryl, cycloalkyl, a metal ion or other pharmaceutically acceptable cations as defined below, or a prodrug ester;

$R^{5a}$ is H, alkyl, cycloalkyl, aryl, aryl-alkyl, metal ion or other pharmaceutically acceptable cations as defined below, or a prodrug ester;

$R^1$ a lipophilic group containing at least 7 carbons and is alkyl containing 7 to 25 carbons in the chain; alkenyl containing from 7 to 25 carbon atoms in the chain and from 1 to 6 double bonds; alkynyl containing from 7 to 25 carbon atoms in the chain and from 1 to 6 triple bonds; mixed alkenyl-alkynyl containing 1 to 5 double bonds and 1 to 5 triple bonds; and where in the above groups alkenyl and/or alkynyl may be substituted or unsubstituted; cycloalkyl; cycloheteroalkyl linked through a carbon on the ring or a heteroatom; aryl; heteroaryl; heteroarylalkyl; cycloalkylalkyl; cycloheteroalkylalkyl; or a group of the structure

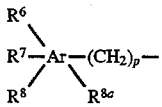

wherein Ar is aryl (such as phenyl or naphthyl), heteroaryl (5 or 6 membered) and may include one to three additional rings fused to Ar (such as aryl, cycloalkyl, heteroaryl or cycloheteroalkyl) and wherein $(CH_2)_p$ contains from 1 to 15 carbons, preferably 2 to 12 carbons, in the chain and may include 0, 1, 2 or 3 double bonds and/or 0, 1, 2 or 3 triple bonds in the normal chain, and may contain an ether or amino function in the chain, and/or may include 0, 1, 2 or 3 substituents as defined below for $R^6$; and $R^6$, $R^7$, $R^8$ and $R^{8a}$ are the same or different and are H, alkyl containing 1 to 40 carbons, preferably from 3 to 25 carbons, alkoxy containing 1 to 40 carbons, preferably from 3 to 25 carbons, alkenyl containing 2 to 40 carbons, preferably from 3 to 25 carbons, alkenyloxy containing 2 to 40 carbons, preferably from 3 to 25 carbons, alkynyl containing 2 to 40 carbons, preferably from 3 to 25 carbons, alkyloxy containing 2 to 40 carbons, preferably from 3 to 25 carbons, cycloheteroalkyl, cyclohetero-alkylalkyl, heteroaryl, cycloalkyl, cycloalkyl-alkyl, Ar-alkyl, (such as arylalkyl), ArO (such as aryloxy), Ar-amino (such as arylamino), hydroxy, halogen, nitro, Ar (such as aryl), amino, substituted amino wherein the amino includes 1 or 2 substituents (which are alkyl, alkenyl, aryl or any of the Ar groups mentioned above), thiol, alkylthio, Ar-thio (such as arylthio), alkyl-sulfinyl, Ar-sulfinyl (such as arylsulfinyl), carboxy, cyano, alkoxycarbonyl, aminocarbonyl, alkylcarbonyloxy, Ar-carbonyloxy (such as arylcarbonyloxy), Ar-carbonylamino (such as arylcarbonylamino) or alkylcarbonylamino, as well as any of the Ar groups as defined above, and preferably wherein the total number of carbons in the substituted Ar—$(CH_2)_p$— group exceeds 10 carbons; including pharmaceutically acceptable salts thereof such as alkali metal salts such as lithium, sodium or potassium, alkaline earth metal salts such as calcium or magnesium, as well as zinc or aluminum and other FDA approved cations such as ammonium, choline, diethanolamine, ethylenediamine, and salts of naturally occuring amino acids such as arginine, lysine, alanine and the like or prodrug esters as disclosed in application Ser. No. 266,843.

The $(CH_2)p$ group may contain 1, 2, 3 or more alkyl, alkoxy, alkenyl, alkynyl, hydroxy and/or halogen substituents as well as any of the substituents defined for $R^6$.

The substantially optically pure phosphonate diester I or phosponate thioester IV is employed as the starting material to form the phosphonosulfonate squalene synthetase inhibitor VIA as set out in the following reaction scheme.

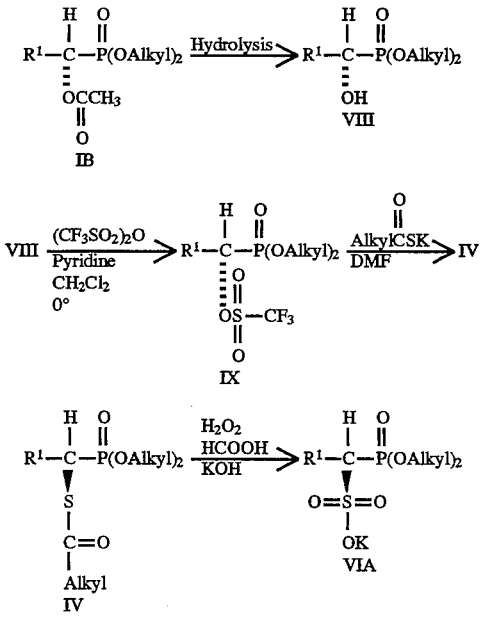

The starting racemic phosphonate alcohol II may be prepared according to the following reaction sequence.

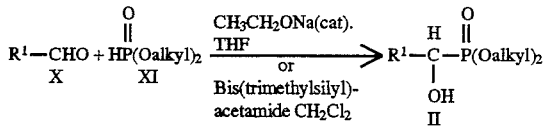

The starting racemic phosphonate thioester V may be prepared according to the following reaction sequence.

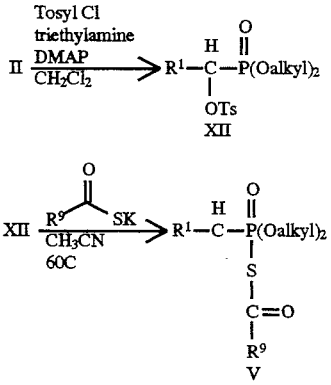

DETAILED DESCRIPTION OF INVENTION

Unless otherwise indicated, the term "lower alkyl" or "alkyl" as employed herein alone or as part of another group includes both straight and branched chain hydrocarbons, containing 1 to 40 carbons, preferably 1 to 20 carbons, in the normal chain, more preferably 1 to 12 carbons, such as methyl, ethyl, propyl, isopropyl, butyl, t-butyl, isobutyl, pentyl, hexyl, isohexyl, heptyl, 4,4-dimethylpentyl, octyl, 2,2,4-trimethylpentyl, nonyl, decyl, undecyl, dodecyl, the various branched chain isomers thereof, and the like as well as such groups including 1 to 4 substituents such as F, Br, C1 or I or $CF_3$, alkoxy, aryl, arylalkyl, alkenyl, cycloalkyl, amino, hydroxy, alkylamido, alkanoylamino, arylcarbonylamino, nitro, cyano, thiol and/or alkylthio, as well as any of the other substituents as defined for $R^6$.

Unless otherwise indicated, the term "cycloalkyl" as employed herein alone or as part of another group includes saturated or partially unsaturated cyclic hydrocarbon groups containing 3 to 12 carbons, preferably 3 to 8 carbons, which include cyclopropyl, cyclobutyl, cyclopentyl, cyclohexyl, cycloheptyl, cyclooctyl, cyclodecyl and cyclododecyl, cyclohexenyl, any of which groups may be substituted with 1 to 4 substituents such as halogen, alkyl, alkoxy, hydroxy, aryl, arylalkyl, cycloalkyl, alkylamido, alkanoylamino, arylcarbonylamino, amino, nitro, cyano, thiol and/or alkylthio, as well as any of the other substituents as defined for $R^6$.

Unless otherwise indicated, the term "aryl" as employed herein refers to monocyclic or bicyclic aromatic groups containing from 6 to 10 carbons in the ring portion, such as phenyl, naphthyl, or phenyl or naphthyl substituted with 1 to 4 substituents such as alkyl, halogen (Cl, Br or F), alkoxy, hydroxy, amino, alkanoylamino, arylcarbonylamino, aryl, arylalkyl, cycloalkyl, alkylamido, nitro, cyano, thiol and/or alkylthio, as well as any of the other substituents as defined for $R^6$.

The term "aralkyl", "aryl-alkyl" or "aryl-lower alkyl" as used herein alone or as part of another group refers to alkyl groups as discussed above having an aryl substituent, such as benzyl or phenethyl, or naphthylpropyl.

The term "lower alkoxy", "alkoxy", "aryloxy" or "aralkoxy" as employed herein alone or as part of another group includes any of the above alkyl, aralkyl or aryl groups linked to an oxygen atom.

The term "lower alkylthio", "alkylthio", "arylthio" or "aralkylthio" as employed herein alone or as part of another group includes any of the above alkyl, alkyl, aralkyl or aryl groups linked to a sulfur atom.

The term "lower alkylamino", "alkylamino", "arylamino", or "arylalkylamino" as employed herein alone or as part of another group includes any of the above alkyl, aryl or arylalkyl groups linked to a nitrogen atom.

The term "alkanoyl", as used herein alone or as part of another group refers to alkyl linked to a carbonyl group.

Unless otherwise indicated, the term "lower alkenyl" or "alkenyl" as used herein by itself or as part of another group refers to straight or branched chain radicals of 2 to 40 carbons, preferably 3 to 30 carbons in the normal chain, which include one to six double bonds in the normal chain, such as vinyl, 2-propenyl, 3-butenyl, 2-butenyl, 4-pentenyl, 3-pentenyl, 2-hexenyl, 3-hexenyl, 2-heptenyl, 3-heptenyl, 4-heptenyl, 3-octenyl, 3-nonenyl, 4-decenyl, 3-undecenyl, 4-dodecenyl, 4,8,12-tetradecatrienyl, and the like, and which may be optionally substituted with 1 to 4 substituents, namely, halogen, alkyl, alkoxy, alkenyl, alkynyl, aryl, arylalkyl, cycloalkyl, amino, hydroxy, alkanoylamino, alkylamido, arylcarbonylamino, nitro, cyano, thiol and/or alkylthio, as well as any of the other substituents as defined for $R^6$.

Unless otherwise indicated, the term "lower alkynyl" or "alkynyl" as used herein by itself or as part of another group refers to straight or branched chain radicals of 2 to 40 carbons, preferably 2 to 20 carbons in the normal chain, which include one triple bond in the normal chain, such as 2-propynyl, 3-butynyl, 2-butynyl, 4-pentynyl, 3-pentynyl, 2-hexynyl, 3-hexynyl, 2-heptynyl, 3-heptynyl, 4-heptynyl, 3-octynyl, 3-nonynyl, 4-decynyl,3-undecynyl, 4-dodecynyl and the like, and which may be optionally substituted with to 4 substituents, namely, halogen, alkyl, alkoxy, alkenyl, alkynyl, aryl, arylalkyl, cycloalkyl, amino, hydroxy, alkanoylamino, alkyl-amido, arylcarbonylamino, nitro, cyano, thiol, and/or alkylthio, as well as any of the other substituents as defined for $R^6$.

Examples of suitable $(CH2)_p$ groups include

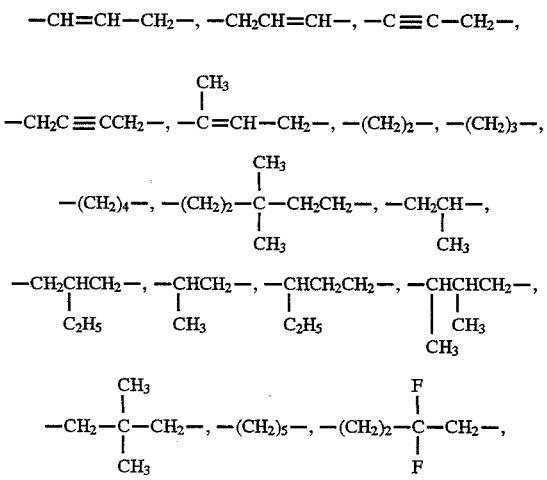

-continued

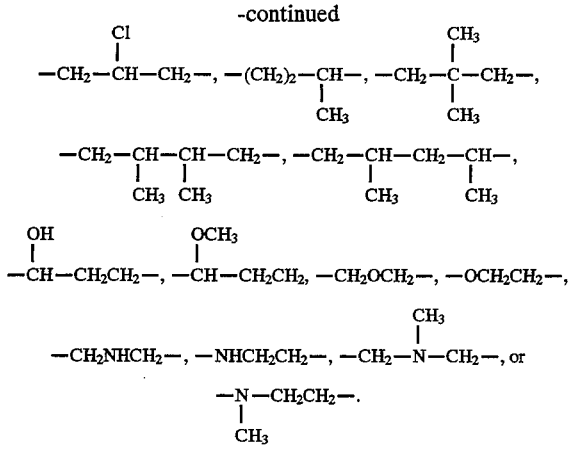

The term "halogen" or "halo" as used herein refers to chlorine, bromine, fluorine, and iodine as well as $CF_3$, with chlorine or fluorine being preferred.

The term "amino" as used herein refers to unsubstituted amino as well as monosubstituted amino or disubstituted amino wherein the substituents may be alkyl and/or aryl.

The term "metal ion" refers to alkali metal ions such as sodium, potassium or lithium and alkaline earth metal ions such as magnesium and calcium, as well as zinc and aluminum.

The term "cycloheteroalkyl" as used herein as an $R^1$ substituent refers to a 5-, 6- or 7-membered saturated ring which includes 1 to 2 hetero atoms such as nitrogen, oxygen and/or sulfur, linked to the carbon "C" of

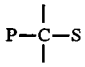

through a carbon atom or a heteroatom, where possible, optionally via the linker $(CH_2)_p$ (which is defined above), such as

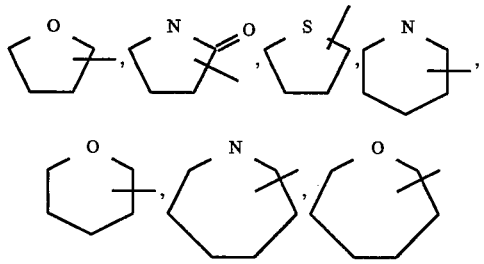

and the like. The above groups may include 1 to 3 substituents such as any of the $R^6$ groups as defined above. In addition, any of the above rings can be fused to a cycloalkyl, aryl, heteroaryl or cycloheteroalkyl ring.

The term "heteroaryl" as an $R^1$ substituent refers to a 5- or 6- membered aromatic ring which includes 1, 2, 3 or 4 hetero atoms such as nitrogen, oxygen or sulfur, which is linked to the carbon "C" of

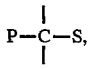

through a carbon atom or a heteroatom, where possible, optionally via the linker $(CH_2)_p$ (which is defined above), such as

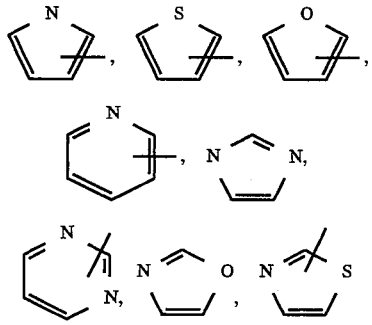

and the like. The above groups may include 1 to 3 substituents such as any of the $R^6$ groups as defined above. In addition, any of the above rings can be fused to a cycloalkyl, aryl, heteroaryl or cycloheteroalkyl ring.

The term "cycloheteroalkylalkyl" as defined by $R^1$ refers to cycloheteroalkyl groups as defined above linked through a C atom or heteroatom to the "C" of

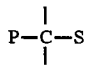

group through a $(CH_2)p$ chain wherein p is preferably 1 to 8.

The term "heteroarylalkyl" as defined by $R^1$refers to a heteroaryl group as defined above linked through a C atom or heteroatom to the "C" of

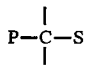

through a $—(CH_2)_p—$chain as defined above, where p is preferably 1 to 8.

Preferred are compounds of formula VI wherein $R^5$ is a metal ion such as Na or K, or H or a pharmaceutically acceptable salt;

$R^{5a}$ is a metal ion such as Na or K;

$R^1$ is $Ar^1—O—Ar^2—(CH_2)_p—$ wherein $Ar^1$ and $Ar^2$ are independently selected from any of the Ar groups defined hereinbefore, and $(CH_2)_p$ is as defined hereinbefore.

"Fermentation" as used herein refers to growth of the microbial cells to be used in a transformation process.

The enzyme or microorganism used in the present processes can be any enzyme or microorganism having the ability to catalyze the enantioselective esterification of alcohols II or hydrolysis of thioester V. Various enzymes, such as esterases and lipases, regardless of origin or purity, are suitable for use in the present invention. The enzyme can be in the form of a mixture of animal and plant enzymes, cells of microorganisms, crushed cells or extracts of cells.

Typical genuses of microorganism suitable as sources of catalyzing enzymes include *Mucor, Escherichia,*

*Staphylococcus, Agrobacterium, Rhizopus, Aspergillus, Nocardia, Streptomyces, Trichoderma, Candida, Rhodotorula, Torulopsis, Humicola, Kibadelosporangium, Bacillus, Alcaligenes, Pseudomonas, Brevibacterium, Enterobacter, Chromobacterium, Arthrobacter, Microbacterium, Mycobacterium, Saccharomyces, Penicillium, Chaetomium, Cladosporium* and the like.

Commercially available enzymes suitable for use in the present invention include lipases, such as Amano P (*Pseudomonas fluorescens*) which is preferred, Amano AY-30 (*Candida cylindracea*), Amano N (*Rhizopus niveus*), Amano R (*Penicillium sp.*), Amano FAP (*Rhizopus oryzae*), Amano AP-12 (*Aspergillus niger*), Amano MAP (*Mucor meihei*), Amano CG-4 (*Geotrichum candidum*), Sigma L-0382 (porcine pancrease), Sigma L-3001 (Wheat germ), Sigma L-1754 (*Candida cylindracea*), Sigma L-0763 (*Chromobacterium viscosum*) and Amano K-30 (*Aspergillus niger*). Additionally, enzymes derived from animal tissue include esterase from pig liver, α-chymotrypsin and pancreatin from pancreas.

Specific microorganisms suitable for use in the present process include *Pseudomonas fluorescens, Pseudomonas putida, Escherichia coli, Staphylococcus aureus, Alicaligenes faecalis, Streptomyces griseus, Streptomyces clavuligerus, Nocardia erthropolis, Nocardia asteroides, Mycobacterium phlei, Agrobacterium radiobacter, Aspergillus niger, Rhizopus oryzae* and the like.

Preferred are Geotrichum candidum and esterase (Esterase 30,000 (Gist Brocades)).

Microbially derived enzymes may be used in free state or immobilized on support. Suitable carriers are diatomaceous earth (porous Celite® Hyflo Supercel), microporous polypropylene (Enka Accurel® polypropylene powder), or a nonionic polymeric adsorbent such as Amberlite® XAD-2 (polystyrene), XAD-7 (polyacrylate) and the like. A carrier immobilizes the enzyme, which controls the enzyme particle size and prevents aggregation of the enzyme particles when used in an organic solvent. This can be accomplished, for example, by precipitating an aqueous solution of the enzyme with cold acetone in the presence of the Celite® Hyflo Supercel followed by vacuum drying, or in the case of a nonionic polymeric absorbent, incubating enzyme solutions with absorbent on a shaker, removing excess solution and drying enzyme-adsorbent resins under vacuum.

Desired enantiomers can be isolated from the reaction mixture and purified by known methodologies such as extraction, distillation, crystallization, column chromatography, and the like.

As will be apparent to those skilled in the art, the processes of the present invention can be carried out using microbial cells containing an appropriate enzyme. When using a microorganism to perform the resolution, the present processes are conveniently carried out by adding the cells and the racemic starting materials to the desired solution. Cells may be used in the form of intact cells, dried cells such as lyophilized, spray-dried or heat-dried cells, immobilized cells, or cells treated with organic solvents such as acetone or toluene. Cells may also be used in the form of treated cell material such as ruptured cells or cell extract. Cell extracts immobilized on Celite® or Accurel® polypropylene as described earlier can also be used.

Appropriate media for growing microorganisms for these processes typically include necessary carbon sources, nitrogen sources, and trace elements. Inducers such as fats or oils may also be added.

Carbon sources include sugars such as maltose, lactose, glucose, fructose, glycerol, sorbitol, sucrose, starch, mannitol, propylene glycol, and the like; organic acids such as sodium acetate, sodium glutamate and the like; amino acids such as sodium glutamate and the like; alcohols such as ethanol, propanol, and the like; and oils such as soybean oil and the like.

Nitrogen sources include N-Z amine A, corn steep liquor, soy bean meal, beef extracts, yeast extracts, baker's yeast, tryptone, nutrisoy, peptone, yeastamin, sodium nitrate, ammonium sulfate, and the like.

Trace elements include phosphates and magnesium, manganese, calcium, cobalt, nickel, iron, sodium, and potassium salts.

It is within the scope of this invention that appropriate media may include more than one carbon or nitrogen source and may include a mixture of several.

A typical medium for growth of such cells is:

| Material Name | Concentration (% w/v) |
|---|---|
| Cerelose hydrate | 4.4 |
| Ammonium sulfate | 0.75 |
| Yeast extract | 0.10 |
| Uncon antifoam | 0.04 |
| Corn steep liquid | 3.3 |

The pH of the medium is adjusted to 6.8 to 7.0 prior to sterilization.

The temperature of the reaction mixture should be maintained to ensure that there is sufficient energy available for the processes.

The following examples represent preferred embodiments of the present invention. Unless indicated otherwise, all temperatures are expressed in degrees Centigrade (° C.).

EXAMPLE 1

Preparation of Racemic Starting Material [1-Hydroxy-4-4(3-phenoxyphenyl)butyl]phosphonic acid, diethyl ester

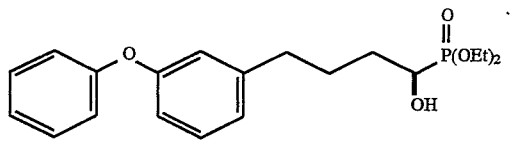

(Racemic)

A.

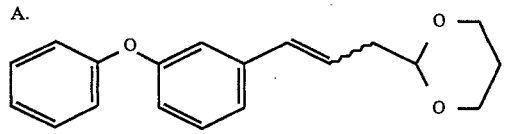

A magnetically stirred suspension of

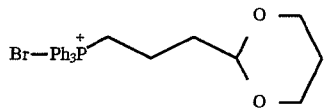

(25.10 g, 54.88 mmol) in THF (400 mL) under argon was cooled to about −45° C. (dry ice-methanol). After temperature equilibration (~15 minutes), 1.6 M n-butyllithium (33.5 mL, 53.60 mmol) was added drop-wise via syringe. The reaction mixture became pale yellow in color. The reaction was allowed to warm to 0° C. and was stirred for 30 minutes and then cooled to about −78° C. (dry ice-acetone). 3-Phenoxy benzaldehyde (9.0 mL, 52.01 mmol) was added drop-wise via syringe and the reaction was allowed to warm slowly to room temperature over twelve hours. The reaction was quenched by adding acetic acid (2 mL) followed by hexane (400 mL) and then cooled to about 0° C. to precipitate as much of the phosphine oxide as possible. The mixture was filtered and the filtrate concentrated and then passed through a pad of Silica gel (2.5 inches by 5 inches diameter) using ethyl acetate-hexane (1:5 ratio, ~1 L) as the eluent. Evaporation of the solvent under reduced pressure yielded title compound (5.96 g, 99%) as a clear yellow oil. TLC: $R_f$=0.40 and 0.48 (mixture of E and Z isomers). [Silica gel, ethyl acetate-hexane, 1:5, visible with UV and PMA staining]

B.

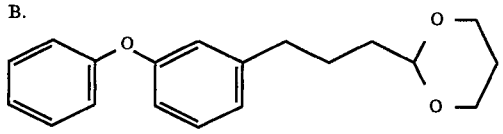

Part A compound (15.42 g, 52.01 mmol) ethyl acetate (114 mL), and 5% Pd/C (1.1 g) were added into a Parr bottle which was connected to the Parr apparatus. The system was evacuated and back-filled with hydrogen gas five times and then allowed to shake over night under 50 psi of hydrogen pressure. After twelve hours, the system was again evacuated to remove hydrogen and then the reaction mixture was passed through a 5 inch diameter pad of Silica gel (0.5 inch, top) and Celite®(1 inch, bottom). The filtrate yielded title compound (15.28 g, 99%) as a clear viscous oil after removal of the solvent under reduced pressure.

TLC: $R_f$=0.48, [Silica gel, ethyl acetate-hexane, 1:5, visible with UV and PMA staining].

C.

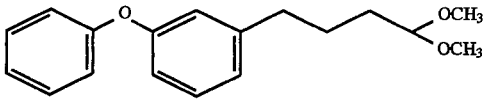

To a magnetically stirred solution of Part B compound (15.28 g, 51.28 mmol) in methanol (650 mL), was added a catalytic amount of para-toluene-sulfonic acid (0.112 g, 0.589 mmol). The mixture was refluxed at 75° C. for three hours and then worked-up by adding solid $NaHCO_3$ (0.5 g) and evaporating the methanol under reduced pressure. The residue was then partitioned between water (200 mL) and ethyl acetate (250 mL). The aqueous layer was extracted once more with ethyl acetate (250 mL) and then the organic layers were combined and dried over $MgSO_4$, filtered, and evaporated under reduced pressure producing a viscous residue. To a magnetically stirred solution of the resulting residue in methanol (500 mL), was added para-toluenesulfonic acid (0.072 g, 0.379 mmol). The mixture was refluxed at 75° C. for four hours and then worked up exactly as before resulting in the title compound (14.1 g crude, >80% NMR yield) as a clear slightly yellow oil. TLC: $R_f$=0.58, [Silica gel, ethyl acetate-hexane, 1:5 visible with UV and PMA staining].

D.

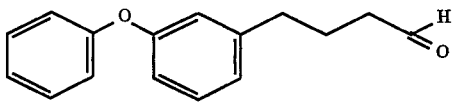

A magnetically stirred solution of Part C 5 compound (2.13 g, 7.44 mmol) in a mixture of acetic acid-water (5:1 volume ratio, 70 mL) was placed under house vacuum periodically (once an hour) for a few minutes to drive the reaction to completion by removing methanol. After about five hours, hexane was used to extract the reaction mixture 7 times with a total of 500 mL. The organic layers were combined and washed with saturated $NaHCO_3$ solution (350 mL) until all the acetic acid in the organic layer was neutralized. The organic layer was then dried over $MgSO_4$, filtered and evaporated under reduced pressure affording title compound (1.72 g, 96%) as a clear viscous oil, which was used immediately in the next step. TLC: $R_f$=0.48, [Silica gel, ethyl acetate-hexane, 1:5, visible with UV and PMA staining].

E. [1-Hydroxy-4-(3-phenoxyphenyl)-butyl]-phosphonic acid, diethyl ester

To a magnetically stirred solution of Part D compound (8.95 g, 37.29 mmol) in dry THF (150 mL) was added diethylphosphite (4.90 mL, 38.04 mmol) and a catalytic amount of sodium ethoxide in ethanol (saturated solution, 0.85 mL). After 20 hours, acetic acid was added to neutralize the sodium ethoxide. Solid $NaHCO_3$ was used to neutralize any excess acetic acid and the THF was partially removed under reduced pressure. The residue was partitioned between water (150 mL) and ethyl acetate (200 mL), separated, and the resulting aqueous layer extracted twice more with ethyl acetate (200 mL each). The organic layers were combined, dried over $MgSO_4$, filtered and the solvent evaporated under reduced pressure to give 14.03 g of crude material. Purification of a fraction of the resulting residue (10.96 g) by column chromatography (Silica gel, eluted with methanol: methylene chloride, 5:95 ratio) afforded the title compound (8.74 g, 80%) as a clear viscous oil.

TLC: $R_f$=0.23, [Silica gel, ethyl acetate, visible with UV and PMA staining].

EXAMPLE 2

Preparation of S-(+)-[1-(Acetyloxy)-4-(3-phenoxyphenyl)butyl]-phosphonic acid diethyl ester Via Enzymatic Transesterification of [1-Hydroxy-4-(3-phenoxyphenyl) butyl]phosphonic acid, diethyl ester Enzymatic transesterification of racemic [1-hydroxy-4-(3-phenoxyphenyl)butyl]phosphonic acid, diethyl ester (prepared as described in Example 1) (1.1 g/L) was conducted in 2.0 L of toluene dried over 4° A molecular sieves, in the presence of 24.2 mL of isopropenyl acetate, 0.55 mL water and 63 g of *Geotrichum candidum* lipase (Biocatalyst) in a 3L glass reactor, at 35° C. The enzyme was kept suspended by an agitator at 200 rpm. Reactions were monitored for the formation of the acetate and optical purity. After the reaction was complete (after 137 hours), the enzyme was recovered by filtration, washed with toluene and air dried. The recovered enzyme from the first reaction was reused in the second reaction.

After the preparative scale resolutions, the reaction mixture was filtered to remove the enzyme, after which toluene was removed under reduced pressure to produce a light brown liquid (2.41 gm). Chromatography on this material on 100 gm of silica gel, which was pre-washed with 400 mL of ethyl acetate-hexane (80:20) mixture, afforded 0.85 grams of S-(+)-[1-(acetyloxy)-4-(3-phenoxyphenyl)butyl]-phosphonic acid, diethyl ester, when eluted with ethyl acetate-hexane-triethyl amine (80:17:3) as a colorless oil. Eluting further with 300 mL of eluant recovered 0.85 gm (38% yield) of alcohol. Isolated acetate (yield 38%): HPLC HI was <98% and optical purity was 95%. $[A]_D$=+7.5 =1 in $CH_2Cl_2$. Recovered alcohol: HPLC HI of the material was <97% and optical purity was 87%.

Analytical Methods

Quantitation of starting racemic alcohol and corresponding acetate was performed by HPLC using a HP Hypersil ODS column, 40% isopropanol in water as eluting solvent at a flow rate of 0.5 ml/min, at 37° C. The retention items for the alcohol and the acetate were 18.7 and 25.01 minutes, respectively. Elution of both compounds was monitored at 273 nm. The absorption maxiumum was determined using a spectorophotometer.

EXAMPLE 3

Preparation of Substantially Optically Pure Phosphonosulfonate Squalene Synthetase Inhibitor

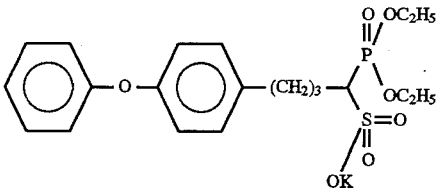

The substantially optically pure acetate prepared in Example 2 was used as a starting material in carrying out the preparation of (S)-(+)-3-phenoxy-α-phosphonobenzenebutane sulfonic acid, tripotassium salt as follows:

A. Hydrolysis of Starting Acetate to Alcohol

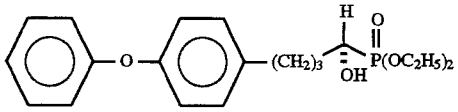

The Example 2 acetate is hydrolyzed to the corresponding alcohol employing conventional procedures such as treating Example 2 acetate with aqueous potassium hydroxide or potassium carbonate in the presence of methanol.

B. Preparation of Triflate

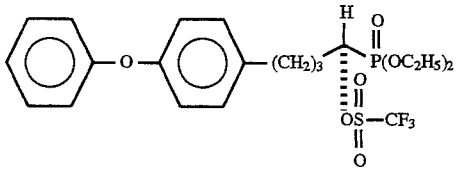

To a stirred solution of Part A alcohol (216 rag, 0.57 mmol) and pyridine (125 μL) in $CH_2Cl_2$ (2 mL) at 0° C. under argon is added trifluoromethane sulfonic anhydride (100 μL, 0.59 mmol) over about 10 min. After another 15 min., the reaction mixture is warmed to room temperature, stirred for 20 min., diluted with diethyl ether, washed with 1M HC1, and then with brine, dried over $MgSO_4$, filtered and stripped to give title triflate.

C. Preparation of Phosphonate Thioester

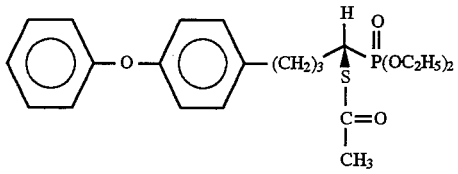

To stirred solution of Part B triflate (195 mg, 0.38 mmol) in DMF (2 mL) at room temperature under argon is added

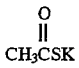

(96 mg, 0.84 mmol, 2.2 eq) to form title thioester.

D. Preparation of Phosphonosulfonate

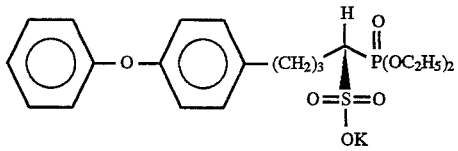

Formic acid (3.50 ml) and hydrogen peroxide (0.35 ml) are premixed for 1 hour at room temperature under argon, then chilled to 0° C. and Part C thioester in formic acid is added dropwise. The reaction is warmed to room temperature.

1M $K_2SO_3$ is added until presence of peroxide is negative. The reaction is neutralized with 1M KOH (100 ml) (for pH 1.8 to 3.0) and concentrated to title compound.

EXAMPLE 4

Preparation of Racemic Starting [1-(Acetylthio)-4-(3-phenoxyphenyl)butyl]phosphonic acid, diethyl ester

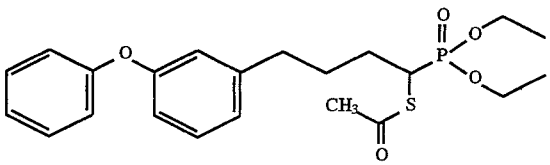

Racemic

A.

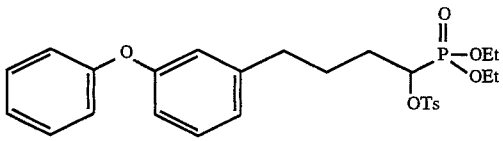

To a magnetically stirred solution of Example 1 racemic alcohol (3.49 g, 9.23 mmol) in dichloro-methane (40 mL)

was added para-toluenesulfonyl chloride (2.63 g, 13.80 mmol) and N,N-dimethyl-aminopyridine (0.346 g, 2.84 mmol) using a solid addition funnel under argon atmosphere followed by triethylamine (3.2 mL, 22.95 mmol) via a syringe. After six hours of stirring at room temperature the reaction mixture was poured into 0.1 N HCl (40 mL), extracted with dichloromethane (40 mL) and the organic layer was washed with water (40 mL), dried over magnesium sulfate, filtered and concentrated to afford 5.01 g (~99% yield) of crude title trosylate. The material was carried on to the next step without any further purification: TLC Rf=0.48 (product) and Rf=0.23 (starting material), [Silica gel; ethyl acetate], visualization with UV and PMA.

B. Racemic [1-(Acetylthio)-4-(3-phenoxy-phenyl)butyl] phosphonic acid, diethyl ester To a magnetically stirred solution of the Part A tosylate (4.91 g, 9.23 mmol) in acetonitrile (45 mL) was added solid potassium thioacetate (3.00 g, 26.32 mmol) in one portion. The reaction mixture was heated for 14 hours at 60° C. to complete the reaction. Acetonitrile was removed under vacuum and the residue partitioned between ethyl acetate (125 mL) and water (75 mL). The layers were separated and the aqueous layers were extracted with ethyl acetate (75 mL). The organic layers were then combined and washed with brine (100 mL), dried over magnesium sulfate, filtered and concentrated to afford 3.94 g of a crude dark red viscous oil. Purification by column chromatography (Silica gel; 3:1 ethyl acetate:hexanes) and treatment with decolorizing charcoal gave 2.31 g (57% yield) of title compound as a clear viscous oil. TLC Rf=0.27 (product) and $R_f$=0.34 (starting material) [Silica gel; ethyl acetate: hexanes (3:1)], visualization by UV and PMA.

EXAMPLE 5

Preparation of S-[1-(Acetylthio)-4-(3-phenoxy-phenyl)butyl]phosphonic acid, diethyl ester

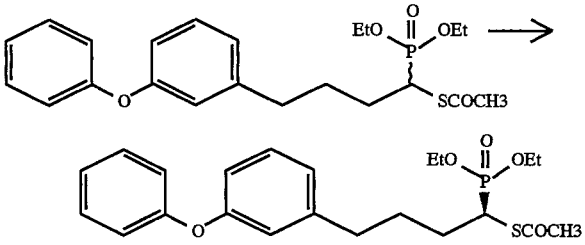

S-thiol

About 10 mg of racemic thioester prepared in Example 4 was dissolved in 10 ml of toluene in a 50 ml flask. To this solution 250 mg of Esterase (Gist-Brocades) enzyme was added along with 0.01 ml of water. The reaction mixture was then shaken on a gyrotary shaker at 200 rpm at 25° C. After 72 hours, the enantomeric composition of the unreacted substrate (obtained at 20% yield) was 65% S-enantiomer and 35% R-enantiomer of the thio-ester.

EXAMPLE 6

Preparation of Substantially Optically Pure Phosphonosulfate Squalene Synthetase Inhibitor

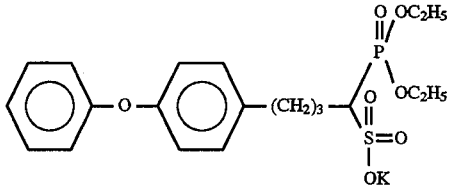

The substantially optically pure thioester prepared in Example 4 is used as a starting material in carrying out the preparation of (S)-3-phenoxy-α-phosphonobenzene-butane sulfonic acid, tripotassium salt employing the procedure set out in Example 3 Part D.

What we claim is:

1. A method for preparing a substantially optically pure phosphonate of the structure

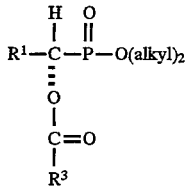

wherein $R^1$ is a lipophilic group containing at least 7 carbons;

$R^3$ is alkyl, cycloalkyl, aryl or arylalkyl; which comprises reacting a racemic phosphonate of the structure

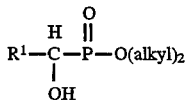

wherein $R^1$ is as defined above, with an ester of the structure

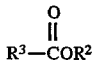

wherein $R^3$ is as defined above; and $OR^2$ represents a leaving group and $R^2$ is alkyl, aryl, arylalkyl or alkenyl, in the presence of an enzyme or microorganism which is a source for enzyme capable of catalyzing trans- esterification of an alcohol, to form the substantially optically pure phosphonate, and recovering the substantially optically pure phosphonate.

2. The process as defined in claim 1 wherein the microorganism employed as a source for enzyme is of the genus *Mucor, Escherichia, Staphylococcus, Agrobacterium, Rhizopus, Aspergillus, Nocardia, Streptomyces, Trichoderma, Candida, Rhodotorula, Torulopsis, Humicola, Kibdelosporangium, Bacillus, Alcaligenes, Pseudomonas, Brevibacterium, Enterobacter, Chromobacterium, Arthrobacter, Microbacterium, Mycobacterium, Saccharomyces, Penicillium, Chaetomium, Cladosporium* or *Geotrichum.*

3. The process as defined in claim 2 wherein the enzyme employed is *Candida cylindracea, Pseudomonas*

*fluorescens, Rhizopus niveus, Penicillium sp., Rhizopus oryzae, Aspergillus niger, Mucor meihei, Geotrichum candidum, porcine pancreas, wheat germ, Chromobacterium viscosum, Novo Lipolase, Pseudomonas lipase, esterase, α-chymotrypin* and *pancreatin.*

4. The process as defined in claim 1 wherein the microorganism employed is *Pseudomonas fluorescens, Pseudomonas putida, Escherichia coli, Staphylococcus aureus, Geotrichum candidum, Alcaligenes faecalis, Steptomyces griseus, Streptomyces clavuligerus, Nocardia erthropolis, Nocardia asteroides, Mycobacterium phlei, Agrobacterium radiobacter, Aspergillus niger, Rhizopus oryzae* or *Esterase* 30000 enzyme.

5. The process as defined in claim 1 where in the starting racemic phosphonate $R^1$ is alkyl containing 7 to 25 carbons in the chain; alkenyl containing from 7 to 25 carbon atoms in the chain and from 1 to 6 double bonds; alkynyl containing from 7 to 25 carbons on the chain and from 1 to 6 triple bonds; mixed alkenyl-alkynyl containing 1 to 5 double bonds and 1 to 5 triple bonds; or aryl; and where in the above groups alkenyl, alkynyl and/or aryl may be substituted or unsubstituted; cycloheteroalkyl linked through a carbon on the ring or a heteroatom; cycloalkyl; heteroarylalkyl; cycloalkylalkyl; heteroaryl; cycloheteroalkylalkyl; or a group of the structure

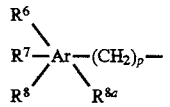

wherein Ar is aryl or heteroaryl, and Ar may include one to three additional rings fused to Ar, and wherein $(CH_2)_p$ contains from 1 to 15 carbons in the chain and may include 0, 1, 2 or 3 double bonds and/or 0, 1, 2 or 3 triple bonds in the normal chain, and may contain an ether or amino function in the chain, and/or may include 0, 1, 2 or 3 substituents as defined below for $R^6$; and $R^6$, $R^7$, $R^8$and $R^{8a}$ are the same or different and are H, alkyl containing 1 to 40 carbons, alkoxy containing 1 to 40 carbons, alkenyl containing 2 to 40 carbons, alkenyloxy containing 2 to 40 carbons, alkynyl containing 2 to 40 carbons, alkynyloxy containing 2 to 40 carbons, hydroxy, halogen, nitro, amino, thiol, alkylthio, alkyl-sulfinyl, alkylsulfonyl, carboxy, alkoxycarbonyl, aminocarbonyl, alkyl-carbonyloxy, alkylcarbonyl-amino, cycloheteroalkyl, cycloheteroalkylalkyl, heteroaryl, cycloalkyl, cycloalkylalkyl, Ar-alkyl, ArO, Ar-amino, Ar, Ar-thio, Ar-sulfinyl, Ar-sulfonyl, cyano, Ar-carbonyloxy, or Ar-carbonylamino.

6. The process as defined in claim 1 wherein the starting racemic phosphonate $R^1$ is $Ar^1$—O—$Ar^2$-$(CH_2)_p$—wherein $Ar^1$ is an aryl group and $Ar^2$ is an aryl group, and p is 1 to 15.

7. The process as defined in claim 6 wherein the starting racemic phosphonate $Ar^1$—O—$Ar^2$—$(CH_2)_p$—is

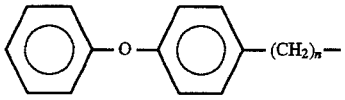

where n is 2, 3 or 4.

8. The process as defined in claim 1 wherein the starting racemic phosphonate is

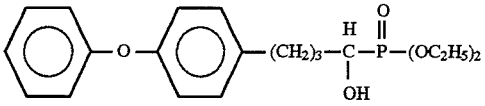

and the product is

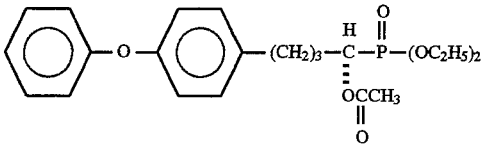

9. The process as defined in claim 1 wherein the reaction of the racemic phosphonate and enzyme or microorganism is carried out at a temperature within the range of from about 15° to about 60° C., in the presence of an ester source of the structure $R^3COOR^2$.

10. The process as defined in claim 9 wherein the inert organic solvent is toluene, hexane, or t-butylmethyl ether and the ester source is isopropenyl acetate, trifluoroethyl butyrate, vinyl butyrate or vinyl acetate.

11. A process for preparing a substantially optically pure phosphonate thioester of the structure

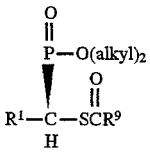

wherein $R^9$ is alkyl'

$R^1$ is a lipophilic group containing at least 7 carbons; which comprises treating a racemic phosphonate thioester of the structure

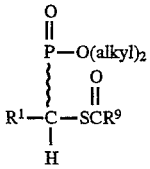

wherein $R^1$ is as defined above, and $R^9$ is alkyl; with an enzyme or microorganism which is a source of enzyme capable of stereoselectively hydrolyzing the thioester bond to form the substantially optically pure phosphonate thioester, and recovering the substantially pure phosphonate thioester.

12. The process as defined in claim 11 wherein the microorganism employed as a source for enzyme is of the genus *Mucor, Escherichia, Staphylococcus, Agrobacterium, Rhizopus, Aspergillus, Nocardia, Streptomyces, Trichoderma, Candida, Rhodotorula, Torulopsis, Humicola, Kibdelosporangium, Bacillus, Alcaligenes, Pseudomonas, Brevebacterium, Enterobacter, Chromobacterium, Arthrobacter, Microbacterium, Mycobacterium, Saccharomyces, Penicillium, Chaetomium, Cladosporium or Geotrichum.*

13. The process as defined in claim 12 wherein the enzyme employed is *Candida cylindracea, Pseudomonas*

*fluorescens, Rhizopus niveus, Penicillium sp., Rhizopus oryzae, Aspergillus niger, Mucor meihei, Geotrichum candidum, porcine pancreas, wheat germ, Chromobacterium viscosum, Novo Lipolase,* and *Pseudomonas lipase, esterase, α-chymotrypin* and *pancreatin.*

14. The process as defined in claim 13 wherein the microorganism employed is *Pseudomonas fluorescens, Pseudomonas putida, Pseudomonas ovalis, Escherichia coli, Staphylococcus aureus, Geotrichum candidum, Alcaligenes faecalis, Steptomyces griseus, Streptomyces clavuligerus, Nocardia erthropolis, Nocardia asteraides, Mycobacterium phlei, Agrobacterium radiobacter, Aspergillus niger, Rhizopus oryzae* or *Esterase* 30000 enzyme.

15. The process as defined in claim 11 where in the starting racemic thioester $R^1$ is $Ar^1—O—Ar^2—(CH_2)_p—$ wherein $Ar^1$ is an aryl group and $Ar^2$ is an aryl group, and p is 1 to 15.

16. The process as defined in claim 11 wherein the starting racemic phosphonate is

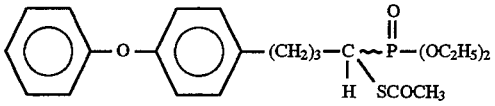

and the product is

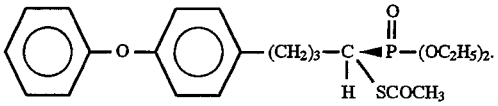

17. A process for preparing a phosphono-sulfonate of the structure

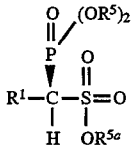

wherein $R^1$ is a lipophilic group containing at least 7 carbons;

$R^5$ is H, alkyl, arylalkyl, aryl or cycloalkyl; or a metal ion or other pharmaceutically acceptable salt, or prodrug ester;

$R^{5a}$ is H, alkyl, arylalkyl, aryl or cycloalkyl, or a metal ion or other pharmaceutically acceptable salt, or prodrug ester;

which comprises providing a substantially optically pure phosphonate thioester of the structure

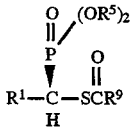

wherein $R^1$ and $R^5$ are as defined above and $R^9$is alkyl, and employing the thioester to form the phosphonosulfonate.

* * * * *